(12) United States Patent
Chopra

(10) Patent No.: US 11,138,773 B2
(45) Date of Patent: Oct. 5, 2021

(54) VISUALIZATION OF DATA FOR OPTIMIZATION OF MULTIDIMENSIONAL PROCESSES

(71) Applicant: SANDBOX SEMICONDUCTOR, INC., Austin, TX (US)

(72) Inventor: Meghali Chopra, Austin, TX (US)

(73) Assignee: Sandbox Semiconductor, Inc., Austin, TX (US)

(*) Notice: Subject to any disclaimer, the term of this patent is extended or adjusted under 35 U.S.C. 154(b) by 15 days.

(21) Appl. No.: 16/589,916

(22) Filed: Oct. 1, 2019

(65) Prior Publication Data

US 2020/0105033 A1    Apr. 2, 2020

Related U.S. Application Data

(60) Provisional application No. 62/739,559, filed on Oct. 1, 2018.

(51) Int. Cl.
*G06T 11/20* (2006.01)
*G06F 16/90* (2019.01)
(Continued)

(52) U.S. Cl.
CPC .......... *G06T 11/206* (2013.01); *G06F 16/904* (2019.01); *G06F 16/9024* (2019.01); *G06T 11/40* (2013.01)

(58) Field of Classification Search
None
See application file for complete search history.

(56) References Cited

U.S. PATENT DOCUMENTS 5,228,119 A * 7/1993 Mihalisin ................ G09G 5/00
                                                         345/418
6,384,847 B1   5/2002 Rabenhorst
(Continued)

FOREIGN PATENT DOCUMENTS

CN           105825288 A        8/2016

OTHER PUBLICATIONS

International Search Report and Written Opinion for PCT Application No. PCT/US2019/054071, dated Jan. 17, 2020.
(Continued)

*Primary Examiner* — Tapas Mazumder
(74) *Attorney, Agent, or Firm* — Locke Lord LLP; Judy R. Naamat

(57) ABSTRACT

Optimization of a process having multidimensional independent and dependent variables includes receiving multidimensional variables, preparing axis sets, each axis of the axis sets having an assigned independent variable, and receiving an innermost or base color plot having values of a selected dependent variable plotted along respective at least first and second axes at initial discrete incremental values. Based on the innermost color plot, the value of the selected dependent variable is computed as a function of at least third and fourth respective independent variables assigned to axes of a second axis set for respective discrete incremental values of each of the respective third and fourth independent variables. Using the computed values, a color plot is plotted along each of the respective third and fourth independent axes at each of the respective discrete incremental values, wherein a stage plot includes the plotted color plots.

24 Claims, 11 Drawing Sheets

(5 of 11 Drawing Sheet(s) Filed in Color)

(51) Int. Cl.
    *G06F 16/901*     (2019.01)
    *G06F 16/904*     (2019.01)
    *G06T 11/40*     (2006.01)

(56) References Cited

U.S. PATENT DOCUMENTS

| | | |
|---|---|---|
| 7,061,490 B2 | 6/2006 | Van Koningsveld |
| 2005/0114801 A1 | 5/2005 | Yang et al. |
| 2017/0091969 A1* | 3/2017 | Daems ................ G06T 11/206 |

OTHER PUBLICATIONS

Hao, M.C., et al., Visual Analytics of Large Multi-Dimensional Data Using Variable Binned Scatter Plots, IS&T/SPIE Electronic Imaging, San Jose, California, United States, Proceedings vol. 7530, Visualization and Data Analysis 2010, pp. 1-11, Jan. 18, 2010 [retrieved on Jan. 7, 2020]. Retrieved from: <URL: https://dx.doi.org/10.1117/12.840142. See pp. 1-10.

* cited by examiner

VISUALIZATION OF DATA FOR OPTIMIZATION OF MULTIDIMENSIONAL PROCESSES

CROSS REFERENCE TO RELATED APPLICATIONS

This application claims priority to U.S. Provisional Patent Application Ser. No. 62/739,559, entitled "Computer Systems and Methods for the Visualization, Interpretation, and Co-Optimization of Multidimensional Processes," filed Oct. 1, 2018, which is incorporated herein by reference in its entirety.

BACKGROUND

1. Field of the Disclosure

The present disclosure generally relates to visualization of data for optimization of multidimensional processes and, more particularly, to systems and methods for spatial mapping and visual coding of multidimensional process spaces.

2. Description of Related Art

Co-optimization generally refers to optimization of multiple independent variables for a given process. Such co-optimization can be performed manually by designing an experiment to be performed for exploring the effect of multiple independent variables on an experimental process that outputs a dependent variable, performing metrology on desired process objectives for the experimental process, and manually refining an experimental process window by changing one or more independent variable values based on the results of the experimental process to achieve the desired process objectives.

These steps can be repeated until all process objectives have been achieved. To determine which independent variable to change, a process engineer may plot each independent variable versus the resulting dependent variable. The process engineer can then attempt to manually track each plot in order to gain insight into relationships between each of the independent variables and the dependent variable. As the number of independent variables increases, so does the complexity of visual representations. Plots can become very numerous, causing interpretation to become difficult.

In addition, process engineers may seek to co-optimize the independent variables for multiple process objectives. For example, a process engineer may decide to increase independent variable A to obtain a desired experimental result for dependent variable Y1. As a result of increasing A though, the ability to achieve a desired experimental result for dependent variable Y2 may be foiled. In this case, the goal can be identification of a process hotspot, wherein a hotspot represents the values of the multiple independent variables for which one or more experimental objectives (e.g., Y1 and Y2) can be achieved. The behavior of nonlinear processes can be very unpredictable, wherein a nonlinear process is a process in which the dependent variable has nonlinear behavior in response to changes in the independent variables. For a highly nonlinear process, locating a hotspot can be especially challenging. For such nonlinear processes, hotspots can be very narrow, crooked, and/or confined to a specific region, making them difficult to define accurately.

Even when plots are displayed as area, bar, column, scatter, surface, or color plots, nonlinear relationships can be illusive, the number of independent variables that can be tracked may be limited, and there may be an inability to study the behavior of nonlinear relationships as associated with multiple objectives.

While conventional methods and systems have generally been considered satisfactory for their intended purpose, there is still a need in the art for systems and methods for visualizations of multidimensional processes that can handle multiple independent variables, show spatial relationships even for non-linear processes, and provide a useful tool for co-optimization in accordance with multiple objectives.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a method of optimization support for a process having multidimensional independent and dependent variables. The method includes receiving multidimensional variables, preparing axis sets, each axis of the axis sets having an assigned independent variable, and receiving an innermost color plot having values of a selected dependent variable plotted along respective at least first and second axes at initial discrete incremental values. Based on an innermost color plot, the method includes computing the value of the selected dependent variable as a function of at least third and fourth respective independent variables assigned to axes of a second axis set for respective discrete incremental values of each of the respective third and fourth independent variables. Using the computed values, the method further includes plotting color plots along each of the respective third and fourth independent axes at each of the respective discrete incremental values, wherein a stage plot includes the plotted color plots.

In another aspect, a method of optimization support for a process having multidimensional independent and dependent variables is provided. The method includes receiving multidimensional variables including at least two independent variables and at least two dependent variables and receiving a plurality of objectives, including a first and second objective associated with respective first and second dependent variables of the at least two dependent variables. A first color plot is computed that represents a relationship between the first dependent variable and an axis set of at least two axes that correspond respectively to at least first and second independent variables of the at least two independent variables, wherein a first color of the first color plot is determined as a function of the first objective. A second color plot is computed that represents a relationship between the second dependent variable and the axis set, wherein the at least two axes correspond respectively to the at least first and second independent variables of the at least two independent variables, wherein a second color of the second color plot is determined as a function of the second objective. The second color and first color plots are superposed to form a superposed plot.

In a further aspect, a process optimization support system is provided that further includes a memory configured to store instructions and a processor disposed in communication with said memory. The processor upon execution of the instructions is configured to receive multidimensional variables including at least four independent variables and at least one dependent variable and to receive an innermost color plot having values of a selected dependent variable plotted along respective at least first and second axes at initial discrete incremental values. A process is repeated at least one of iteratively and concurrently until there are no more remaining independent variables of the at least four independent variables, the process including preparing a next axis set of the plurality of axis sets, the next axis set having at least one next axis, and assigning at least one next independent variable of remaining independent variables of the at least four independent variables to the respective at least one next axis.

The process further includes, based on the innermost color plot, computing the value of the selected dependent variable as a function of the at least one respective next independent variable for respective next discrete incremental values of each of the respective at least one next independent variable. The process further includes using the computed values, plotting color plots along each of the respective next independent axes at each of the respective discrete incremental values, wherein a stage plot includes the plotted color plots is a stage plot.

In accordance with still another aspect of the disclosure, a non-transitory computer readable storage medium and one or more computer programs embedded therein are provided. The computer programs include instructions, which when executed by a computer system, cause the computer system to receive multidimensional variables including at least four independent variables and at least one dependent variable and receive an innermost color plot having values of a selected dependent variable plotted along respective at least first and second axes at initial discrete incremental values. a process is repeated at least one of iteratively and concurrently until there are no more remaining independent variables of the at least four independent variables. The process includes preparing a next axis set of the plurality of axis sets, the next axis set having at least one next axis, and assigning at least one next independent variable of remaining independent variables of the at least four independent variables to the respective at least one next axis.

The process further includes, based on the innermost color plot, computing the value of the selected dependent variable as a function of the at least one respective next independent variable for respective next discrete incremental values of each of the respective at least one next independent variable. The process further includes using the computed values, plotting color plots along each of the respective next independent axes at each of the respective discrete incremental values, wherein a stage plot includes the plotted color plots is a stage plot.

In accordance with any one or more of the above aspects of the disclosure, a method is provided for visualization of data for optimization of a multidimensional process. The method includes displaying, on a display device, a plurality of color plots adjacent to one another, each color plot having a first axis, a second axis orthogonal to the first axis, and one or more colored regions, the first axis representing a first independent variable of the multidimensional process, the second axis representing a second independent variable of the multidimensional process, and the one or more colored regions representing a dependent variable of the multidimensional process, the dependent variable having values that depend at least partly on the first independent variable and the second independent variable, each value of the dependent variable represented by a different colored region in the color plot. The method includes further displaying, on the display device, a color guide having a range of colors that correspond to a range of possible values associated with the dependent variable, the color guide allowing users to visually identify hotspots in the color plots where the dependent variable satisfies a process objective of the multidimensional process, wherein at least some of the color plots are displayed on the display device adjacent to one another along or parallel to a third axis, the third axis representing a third independent variable of the multidimensional process on which the values of the dependent variable at least partly depend.

In accordance with any one or more of the above aspects of the disclosure, the method for visualization of data for optimization of a multidimensional process further includes displaying, on the display device, at least some of the color plots adjacent to one another along or parallel to a next axis representing a next independent variable of the multidimensional process on which the values of the dependent variable at least partly depend. In some embodiments, the next axis and independent variable include one or more of a fourth axis and independent variable, a fifth axis and independent variable, a sixth axis and independent variable, a seventh axis and independent variable, an eight axis and independent variable, a ninth axis and independent variable, a tenth axis and independent variable, and so on.

In accordance with any one or more of the above aspects of the disclosure, a system is provided for visualization of data for optimization of a multidimensional process by performing any of the methods described herein.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
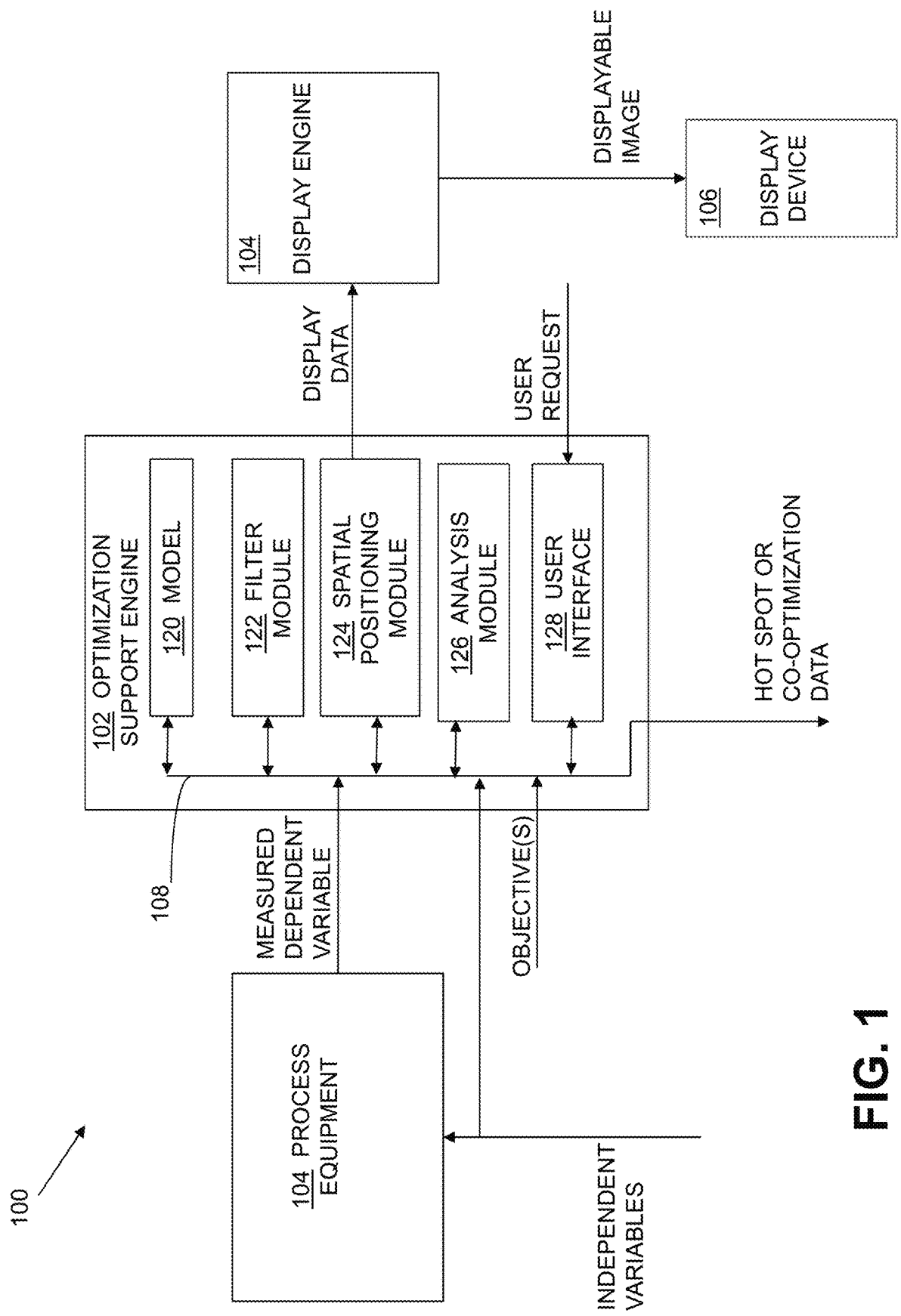
FIG. 1 is a block diagram of an optimization support engine in communication with process equipment and a display engine in accordance with embodiments of the disclosure.

Reference will now be made to the drawings wherein like reference numerals identify similar structural features or aspects of the subject disclosure. For purposes of explanation and illustration, and not limitation, a block diagram of an exemplary embodiment of a process optimization support system (e.g., a visualization system), in accordance with the disclosure, is shown in FIG. 1 and is designated generally by reference character 100. Methods associated with optimization support operations of the process optimization support system 100 in accordance with the disclosure, or aspects thereof, are provided in FIGS. 2-11, as will be described.

Process optimization support system 100 includes an optimization support engine 102 that is configured to receive a set of multidimensional variables from external process equipment 104. The term "receive" refers to retrieving, receiving transmitted data, reading, requesting, or otherwise obtaining. The process equipment 104 can be simulation or experimental equipment that generates or receives at least two independent variables, applies the independent variables to a process, and outputs a result of the process, the result being at least one dependent variable. The multidimensional variables of the set include the independent variables and the dependent variable(s). The optimization support engine 102 can process the multidimensional variables for generating output display data that can be displayed by a graphical user interface of a display device 106. The display data uses or is configured to use spatial relationships to graphically show (i.e., visualize) relationships between the independent variables and the dependent variable.

In one or more embodiments, the display data is displayed and can be visually recognized and/or automatically recognized by recognizing a region or point of the display data that satisfies one or more criteria. The display data can be displayed in a color plot in which each recognized region or point of the display data is shown as a separate color, such that the same color areas or strata of the plot represent the same data values (e.g., for a given process parameter). In one or more embodiments, the display data is not necessarily displayed. That is, in one or more embodiments, the display data is not used for display, but is used for analysis of whether the data satisfies the one or more criteria.

Process objectives can be used to define the one or more criteria that are applied to the multidimensional variables received or the display data. The display data can be analyzed to identify hotspots, which are localized areas of the display data that satisfy the one or more criteria. The hotspots can be used to identify or select independent variable values that best satisfy a given process objective(s). The hotspot can be identified analytically or graphically.

When the multidimensional variables set includes more than one dependent variable, an objective can be provided that corresponds to each respective dependent variable. Display data can be generated for each dependent variable and plotted as a stage plot, as explained later herein. The stage plots can be superposed into a superposed plot. Hotspots can be identified in the superposed plot.

A stage plot can be generated for each dependent variable using multiple sets of axes, or axis sets, for the independent variables. Each axis set can include 2-3 axes, each axis corresponding to a different independent variable. A color plot is generated for each axis set, as mentioned above. The color plot shows or visualizes the relationship between the independent variables and the dependent variable. Additional axis sets can be iteratively added for the dependent variable, one axis at a time, each axis being added as a next axis. For each next axis, the existing color plots can be computed in a manner as described herein in addition to computing a color plot for the newest axis added. By applying the multiple axis sets, a relationship between the dependent variable and many independent variables can be established and shown or visualize as a spatial relationship.

The optimization support engine 102 includes a model 120, a filter module 122, a spatial positioning module 124, an analysis module 126, and a user interface module 128. The modules 120, 122, 124, 126, and 128 can be configured as separate or integrated modules that can share hardware and or software functions, or can be remote and/or independent from one another. One or more communication paths 108 can provide communication between the modules 120, 122, 124, 126, and 128, or the modules can communicate directly with one another via a wired or wireless interface. Communication paths 108 can receive the multidimensional variables and/or user input data via an interface, such as a port, and provide this data to the modules of the optimization support engine 102, including model 120, 122, 124, 126, and/or 128 as needed. The multidimensional variables can be received from process equipment 104, which can be actual or experimental equipment or a simulator that simulates an experiment or actual use.

Model 120 receives the multidimensional variables (directly from the interface or via communication bus 108) and prepares these multidimensional variables to be available for use by the other modules, such as the filter module 122 and/or the spatial positioning module 124. In one or more embodiments, such as when experimental data from process equipment 102 is lacking or incomplete, or instead of experimental data from the processing equipment 102, model 120 can apply a physical or statistical model to generate the multidimensional variables. Applying the physical or statistical model can include providing dependent variable values that correspond to one or more selected independent variables over a selected range. In one or more embodiments, model 120 can extract selected variables from data received from the process equipment 102 and/or provide selected variables over a respective range of interest. The other modules, such as the spatial positioning module 124, filter module 121, or analysis module 126, can request and receive from the model 120 dependent variable values (e.g., measured values) for a selected combination of independent variables over their respective ranges of interest.

Filter module 122 receives the selected dependent variable values (e.g., measured or spectral values) and an objective that corresponds to the respective dependent variable values. The term spectral value is used herein as a chrome value of a color space, such as RGB or CMYK. The selected dependent variable value can be received by the filter module 122 before or after the spatial positioning module 124 operates on it with other multidimensional variables. If the selected dependent variable value is received before being processed by the spatial positioning module 124, it is a measured (which, as referred to includes a simulated measured) value. If the selected dependent variable value is received after being processed by the spatial positioning module 124, it is an assigned spectral value, such as an RGB value that was assigned by the spatial positioning module 124 based on its measured value. The filter module 122 applies the objective to the selected dependent variable value (e.g., measured or spectral) and outputs a pass/fail value to indicate whether or not the objective was satisfied. Filter module 122 can provide a pass/fail value for the selected dependent variable value (e.g., measured or spectral) as it corresponds to a combination of independent variables through their respective ranges of interest.

The spatial positioning module 124 translates the output of the model 120 (and/or the filter module 122) into individual color plots. A spectral or binary value that corresponds to a color is assigned to each dependent variable value as it is plotted on a color plot. The term color is used broadly, and can include white or black or grey scale. When plotting a color plot, the dependent variable value is plotted using discrete incremental values, which can correspond to each coordinate system (e.g., an x, y pair in 2D, an x, y, z triplet in 3D, etc.), or the dependent variable value can be plotted in accordance with a desired data resolution. All other independent variables are assigned a constant value. The assigned constant value can be predetermined, such as a default value, or selected, such as by a processing device or user input.

The spatial positioning module 124 is configured to apply the methods of the present disclosure to assign independent variables to respective axes of axis sets for each color plot and plot the corresponding dependent variable value as a function of the assigned independent variables. Assignment of independent variables to axes can be in accordance with selected independent variables. The selected independent variables can be provided based on an order or sequence. The independent variables and their order can be preselected, selected by a processor, or entered by user input.

Based on an innermost (i.e., base) color plot, a value of the selected dependent variable can be computed as a function of the at least one respective next independent variable for respective next discrete incremental values of each of the respective at least one next independent variable. Using the computed values, a color plot can be plotted along each of the respective next independent axes at each of the respective discrete incremental values, wherein a stage plot includes the plotted color plots is a stage plot.

Any independent variables that have not yet been assigned to an axis are held at a constant value that can be preselected or selected by a processing device or user input. Once color plots have been computed for an axis, the color plots can be combined and computed for another axis. Once color plots have been computed for all of the axes of all of the axis sets being applied, the result is called a stage plot. Aside from other constraints that may exist due to computing or display resources, a stage plot can include a virtually unlimited number of axis sets, and accordingly, correspond to a virtually unlimited number of independent variables.

Next axis sets can be added iteratively or concurrently, or both, in accordance with a method of the disclosure. When an axis set is added, each axis of the axis set can be added iteratively. Likewise, when an axis set is added, each axis of the axis set can be added concurrently. An axis set can be two-dimensional (2D) or three-dimensional (3D). Accordingly, selection and processing of a next axis set, axis, independent variable, and dependent variable as disclosed herein can be performed concurrently with the selection and processing of a current axis set, axis, independent variable, and dependent variable. Thus, use of the term "next," does not imply a specific order or that something must be performed beforehand.

In one or more embodiments, when adding an axis, if an axis set has been started by assigning an axis but is not yet complete because not all its axes have been assigned yet, then the next axis is added to the incomplete axis set. Axes can be assigned for an axis set in a predetermined order. In a 2D example, the x-axis can be assigned first, and the y-axis can be added in a next iteration after color plots have been plotted in the x-axis direction. In a 3D example, the order of the axes can be x-axis, y-axis, z-axis; however, this ordering of axes is provided as examples and are not intended as limitations. If a next axis is assigned once an axis set is complete, the next axis is assigned to a next axis set based on the prescribed order. In this way, the next axis is parallel to an axis of a previously assigned axis set.

In one or more embodiments, each axis is pre-assigned to an axis set. In this way, the axes can be processed concurrently, for example, when assigning independent variables to and plotting color plots for the axes.

Conceptually, each next axis set can have axes that are placed visually outside the axis sets that already have assigned independent variables. In operation, each next axis set can start on a blank background. A first axis of such next axis set is assigned the next available independent variable and positioned in its coordinate system (e.g., vertically, horizontally, etc.), and then the most recently formed color plots is computed and plotted along the next axis. A new color plot is then formed from a set of color plots plotted on the next axis. The next axis of the axis set is then assigned the next available independent variable and positioned appropriately relative to the previously positioned axis. The process of plotting along the axis is repeated for this next axis. The process for positioning and plotting along a next axis of the axis set is then repeated (such as for 3D or more) until the axis set is complete. Once that axis set is complete, the process for starting a next axis set can be repeated until all of the independent variables have been assigned.

Plotting along a newly positioned axis can include dividing the axis into S equally-sized segments (such as based on the range of the independent variable assigned to the axis). Each axis can use a different number S of segments and/or different segment lengths. In one or more embodiments, each segment is given the same value for its assigned dependent variable along the length of that segment. This value can, for example, be a minimum (min), maximum (max), median, or average (avg) value associated with the segment. In one or more embodiments, the values can be assigned to the segment using a desired technique, such as interpolation. The color plot is computed using the independent variable value(s) given to the segment. This is repeated for each segment.

In one or more embodiments, the dependent variable value can be plotted based on its measured value. This can be scaled for further analysis, such as by analysis module 126. In one or more embodiments, the measured value can be scaled by assigning it a spectral value. In one or more embodiments, the dependent variable value can be submitted to filter 120, which assigns it a binary value, such as pass or fail, based on whether or not its measured value satisfies its corresponding objective.

Stage plots for different dependent variables applied to similar axis sets can be superposed with one another to form a superposed plot. The corresponding axes of the different axis sets, meaning axes assigned to the same independent variable and added in the same configuration, are registered with one another. Aside from other constraints that may exist due to computing or display resources, this superposition process can be performed for a virtually unlimited number of dependent variables.

The color plots, stage plots, and/or superposed plots can be output by the spatial positioning module 124 as display data. The display data can use spectral values or binary values. The display data can be provided to the display engine 104 which translates it into a displayable image that can be displayed by display device 106. Additionally, or alternatively, the display data can be provided to the analysis module 126.

The analysis module 126 can analyze the display data to identify hotspots in individual stage plots or common hotspots in superposed stage plots. When the display data is displayed or otherwise output as binary values (also referred to as pass/fail values), a hotspot can be defined as an overlapping region that includes registered superposed (i.e., stacked) pass representations or values in each of the stage plots included in the superposed plot. When the display data is displayed or otherwise output as spectral values, a hotspot can be defined as an overlapping region that includes registered superposed spectral data representations or values within a predefined range in each of the stage plots included in the superposed plot. The range can be selectable, such as by a processing device or user input. The overlapping region can be assigned a distinguishing characteristic, graphically (e.g., by color or other visual indicator) for display, and/or numerically for further processing.

Once a hotspot is detected, it can be used to determine the values of the independent variables that correspond to the hotspot of the stage plots, including independent variables assigned to nested axes. In one or more embodiments, the user can access these independent variable values by interacting with the displayed data via a graphical user interface (GUI). In one or more embodiments, the analysis module 126 can use these determined independent variable values to recommend selections or actually make selections of values for independent variables input to a process.

User interface 128 can receive user selections that are used by the other modules 120, 122, 124, 126. Examples of user selections include selections independent and dependent variables of the multidimensional variables that are of interest, value ranges of interest for the respective independent variables, prioritized orders for processing the independent and dependent variables, objectives associated with the respective dependent variables, dimensions (e.g., 2D or 3D) of axis sets, order of placing axes for each axis set, selection of a region of interest in a superposed plot, and selection of underlying stage plots or color plots incorporated into the superposed plot. One or more of the user selections can alternatively be provided by a processing device.

Figure 2:
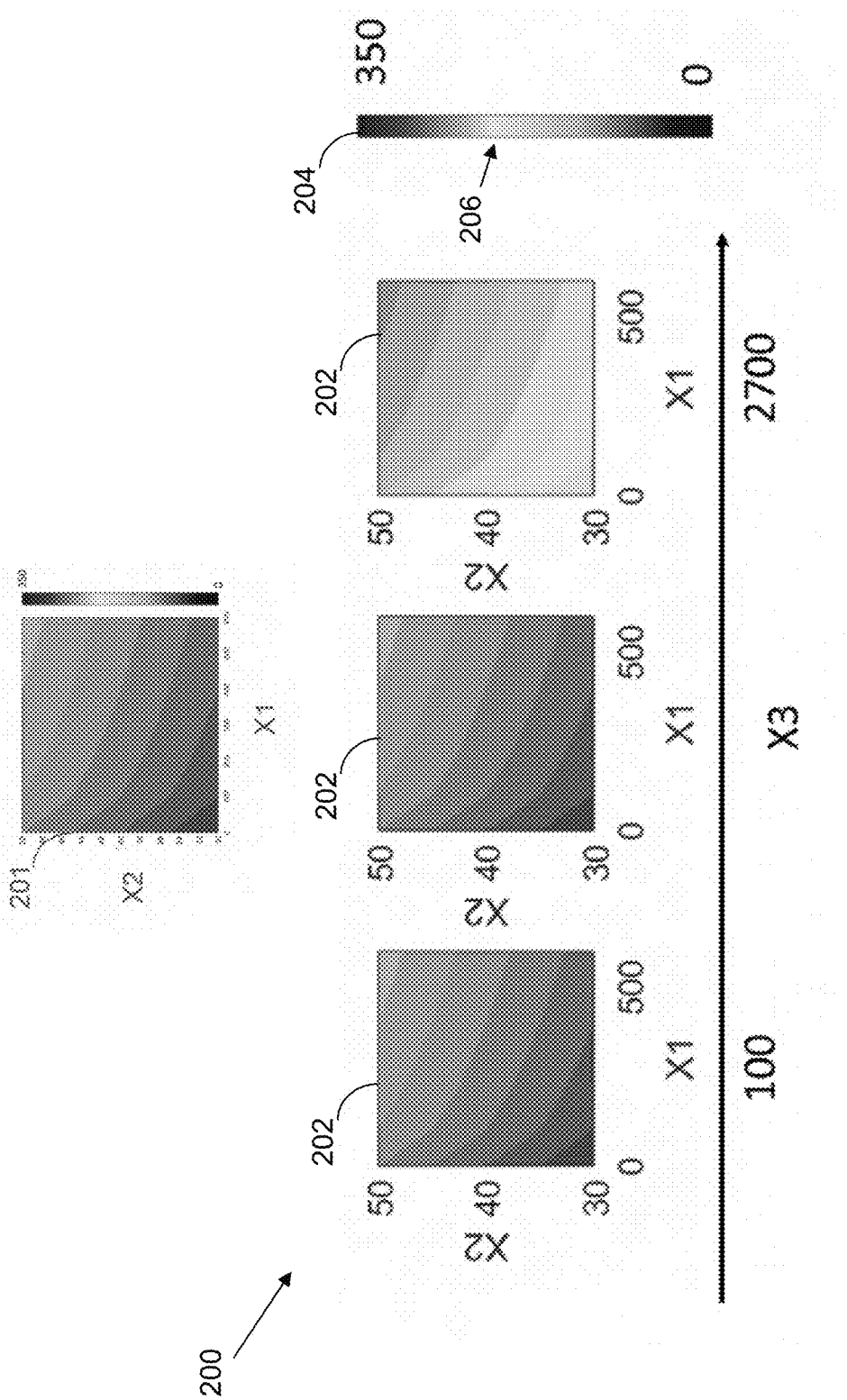
FIG. 2 is a diagram of an exemplary innermost color plot and an example four-dimensional plot for plotting a single dependent variable in accordance with embodiments of the disclosure.

With reference to FIG. 2, an example innermost or base color plot 201 is shown, having a first axis X1 to which a first independent variable is assigned for a range 0-500 (units omitted) and a second axis X2 to which a second independent variable is assigned for the range 0-50 (units omitted). Also shown is an example four-dimensional (4D) plot 200 for plotting a single dependent variable. Three axes X1-X3 are assigned respective independent variables and a dependent variable is plotted, forming the four dimensions of plot 200. The innermost color plot 201 is used as a basis for computing and plotting color plots at discrete incremental values along the third axis X3. For the innermost color plot 201 and each color plot 202, all unassigned variables are held at a constant value. The third axis X3 is provided and assigned an independent variable having a range of 0-2700 (units omitted), which is divided into multiple segments.

In the example shown, X3 is divided into three segments (S=3) of equal length, namely 900. A discrete value is assigned to each segment. The discrete value can be a minimum, maximum, mean, average, or midpoint of the segment, for example. The discrete value is applied as a constant value for the entire segment. For illustration purposes, the discrete value is a midpoint of the segment, which is 450, 1350, and 2250 for the three respective segments in FIG. 2. Effectively, the innermost color plot 201 is used for computing color plots 202, which are plotted at the three discrete incremental values along the third axis X3.

The computed color plots 202 can be aligned on the third axis or in an inward direction relative to the third axis X3 so that each of the axis X1, X2 of the color plots 202 are interior relative to the last positioned axis, third axis X3. The three computed color plots 202 can be touching or can be spaced apart relative to one another.

Plotting the color plots 202 in this case includes computing the dependent variable as a function of the discrete incremental values along the third axis X3. Any independent variables that have not yet been assigned to an axis are held at a constant value. Once all color plots 202 have been computed and plotted along axis X3, the color plots 202 can be grouped as one color plot (with spaces in between in this example) or can be treated as individual computed color plots 202. Whether as a group or as individual computed color plots 202, they can be treated as one or more color plots and computed again for plotting along another axis.

Scale guide 204 shows a range of values associated with the dependent variable that are plotted in each color plot (innermost plot 201 or computed plot 202). Arrow 206 points to a value for the dependent variable that satisfies a process objective corresponding to the dependent variable. In this case, the rightmost color plot 202 seems to meet the process objective and can function as a hotspot.

Figure 3:
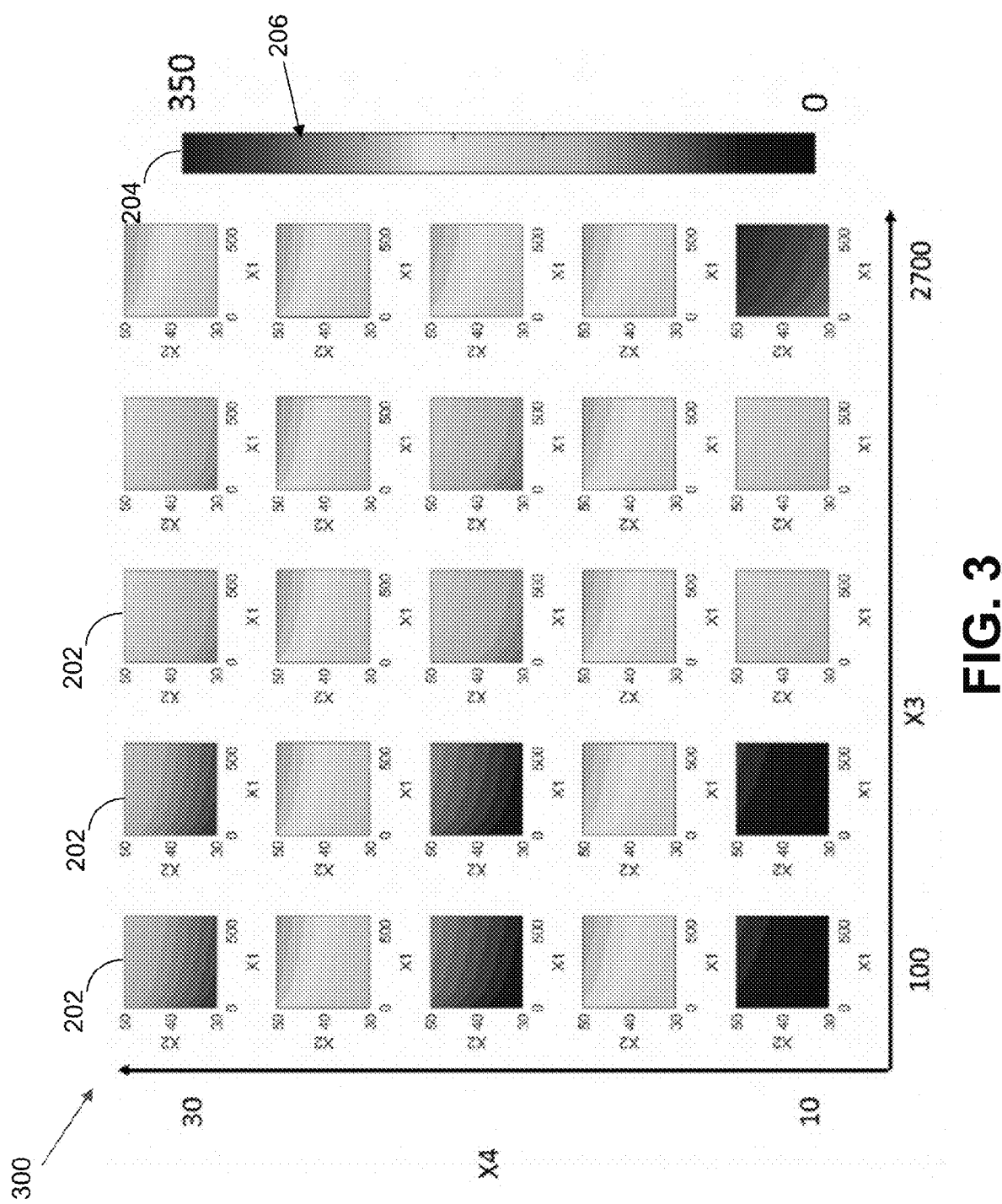
FIG. 3 is a diagram of an example five-dimensional stage plot for plotting a dependent variable in accordance with embodiments of the disclosure.

With reference to FIG. 3, an example five-dimensional (5D) stage plot 300 for plotting a different dependent variable is shown. Color plots 202 are shown, which as in FIG. 2, are 2D plots formed on an axis set that includes a first and second axis X1, X2 with the same assigned independent variables. Stage 300 includes four axes that are each assigned respective independent variables and the plotted dependent variable, forming the five dimensions of stage plot 500. Color plots 202 are plotted on a second axis set having third and fourth axes X3, X4. The first and second axis sets can be conceived as nested axis sets, although the axes of one axis set can be superimposed or nested with respect to the other axis set.

Third axis X3 is provided and assigned an independent variable having a range 0-2700 (units are omitted), which is divided into five segments of equal length, namely 540. An innermost color plot (not shown) is used for computing color plots that are plotted at discrete incremental values assigned to each segment along the third axis X3. The discrete value at each segment is applied as a constant value for the entire segment. For illustration purposes, the value is a midpoint of the respective five segments. Effectively, the computed color plots are computed and plotted at the five discrete incremental values along the third axis X3.

The five computed color plots 202 can be aligned on the third axis or in an inward direction relative to the third axis X3 so that each of the axis X1, X2 of the color plots 202 are interior relative to the last positioned axis, third axis X3. The five computed color plots 202 are shown as spaced apart relative to one another.

In one or more embodiments, the dependent variable is only computed for the third independent variable assigned to the third axis. All other independent variables are held at a constant value. Once all five color plots 202 have been plotted along axis X3, the five color plots 202 can be grouped as one color plot (with or without spaces in between, shown with spaces in this example) or can be treated as individual color plots 202. Either as a group or as individual computed color plots 202, they can be computed again for plotting along fourth axis, X4.

Fourth axis X4 is assigned an independent variable having a range of 30 (units not included), which is divided into five segments of equal length (6). The five computed color plots 202 are each (together or separately) computed again, which includes computing the dependent variable as a function of the discrete incremental values along the fourth axis X4. Any independent variables that have not yet been assigned to an axis, or were previously assigned, are held at a constant value.

In one or more embodiments, when computing the dependent variable for discrete values along an axis, the discrete value can be computed as a function of independent variables assigned to axes for which the dependent variable was already plotted.

Arrow 206 points to a value for the dependent variable that satisfies an objective corresponding to the dependent variable of stage plot 300. In this case, the bottom, right most color plot seems to meet the objective and function as a hotspot.

Figure 4:
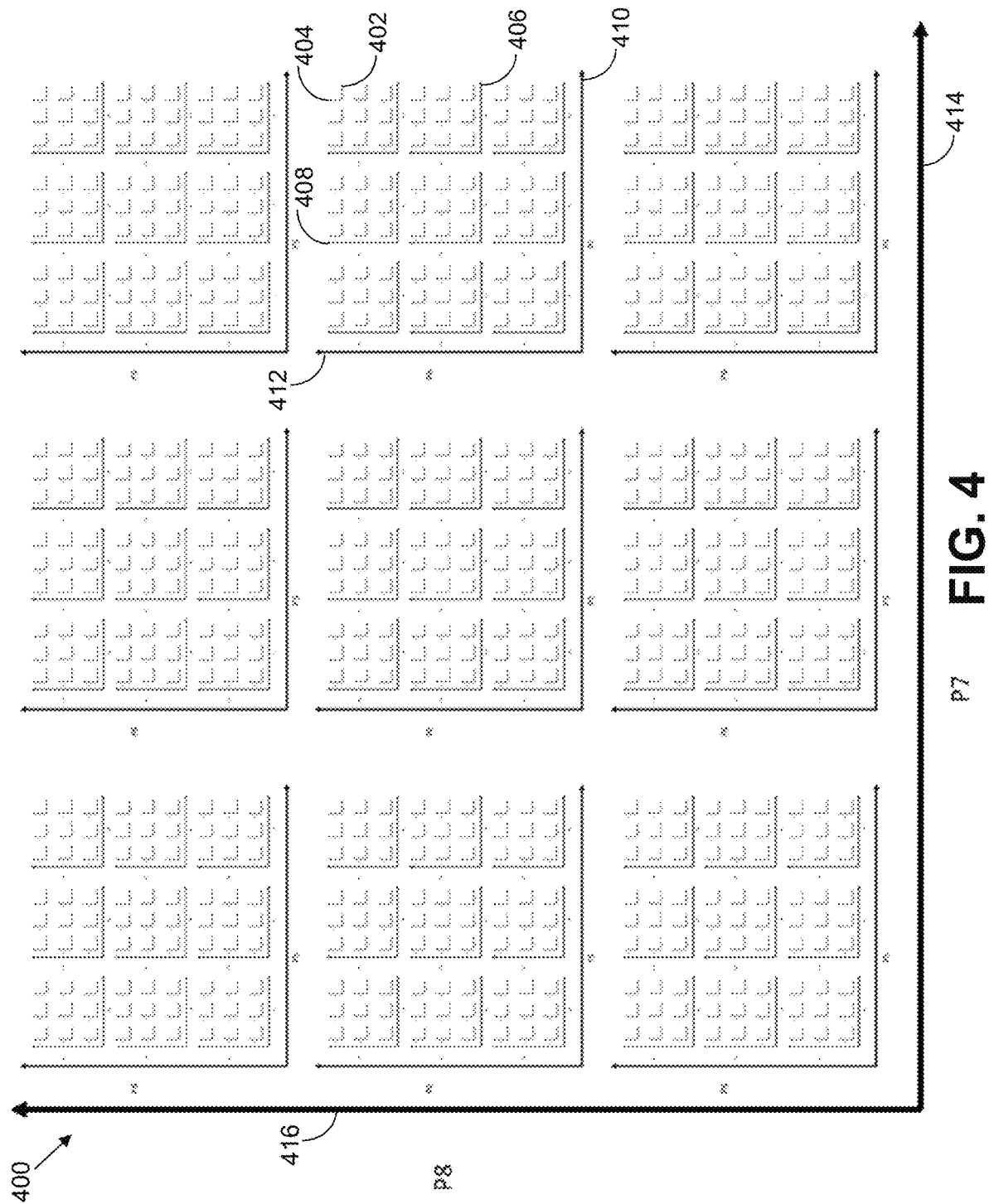
FIG. 4 is diagram of an eight-dimensional frame showing nested axes in accordance with embodiments of the disclosure.

With reference to FIG. 4, an eight-dimensional (8D) frame 400 is shown having four nested axis sets, totaling eight axes in total, each axis corresponding to a different independent variable, providing six independent variables in total. The inner most axis set, X1 (402) and X2 (404) similar to the axes shown at 201 in FIG. 2 is positioned first for forming individual color plots. An innermost color plot is used to compute color plots which are plotted along a second axis set X3 (406) and X4 (408). The computed color plots are calculated again and plotted on a third axis set X5 (410) and X6 (412). The computed color plots are computed again and plotted on a fourth axis set X7 (414) and X8 (416). The eight axes are each assigned respective independent variables.

Figure 5:
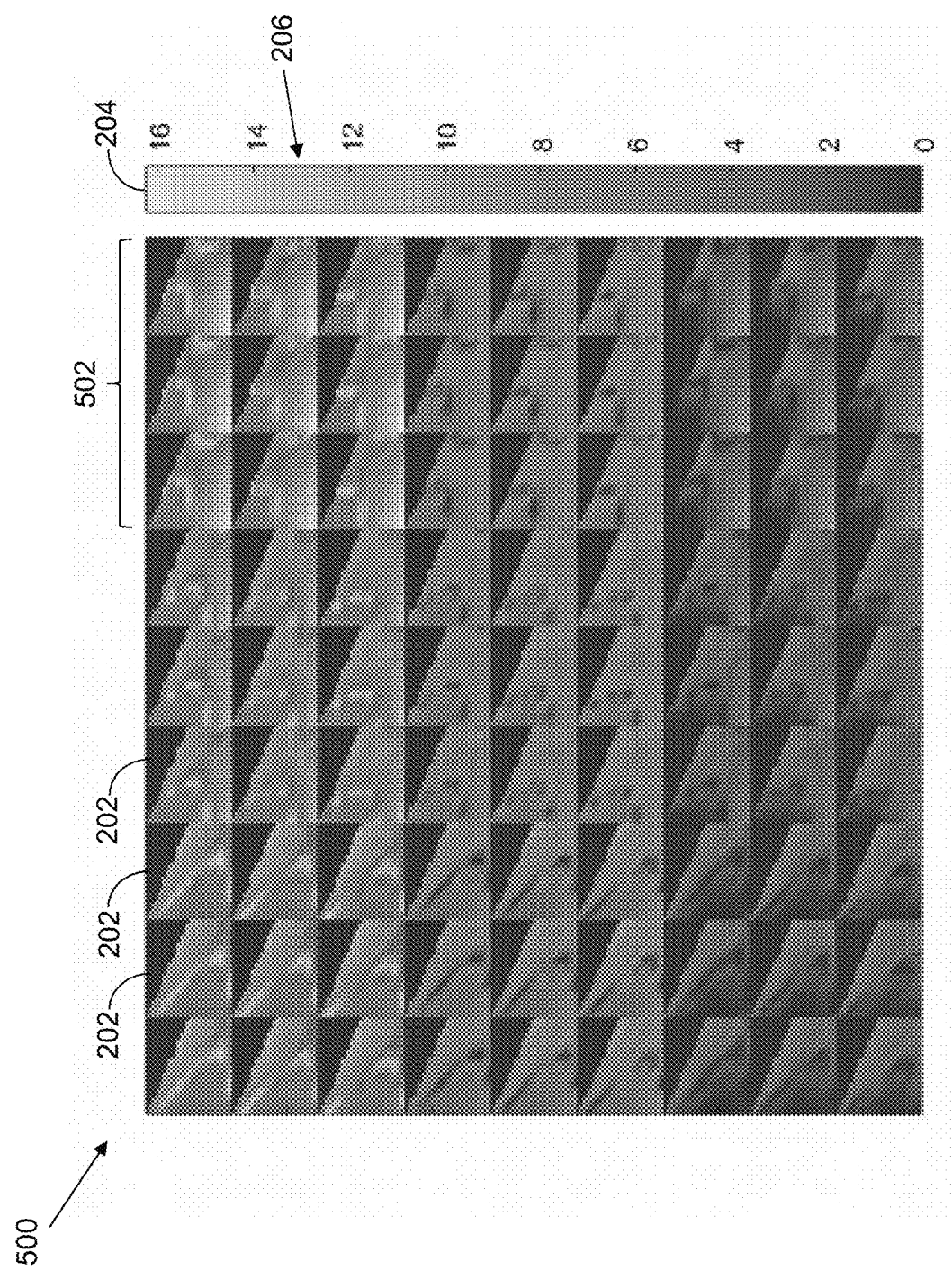
FIG. 5 is diagram of a of a nine-dimensional stage plot for plotting a dependent variable in accordance with embodiments of the disclosure.

With reference to FIG. 5, a nine-dimensional (9D) stage plot 500 in which a dependent variable having a process objective indicated by arrow 206 is plotted with respect to eight independent variable on the frame 400 of eight axes shown in FIG. 4. Nine dimensions are formed by the dependent variable and the eight axes that are assigned respective independent variables. All color plots (computed) are positioned adjacent to and in contact with one another on all sides. Arrow 206 points to a value for the dependent variable that satisfies a process objective corresponding to the dependent variable. Corresponding hotspots in which the process objective is satisfied can be most readily seen in the lower left hand corners in nine of the color plots that are generally indicated at 502 in the upper right hand corner of stage plot 500.

Figure 6:
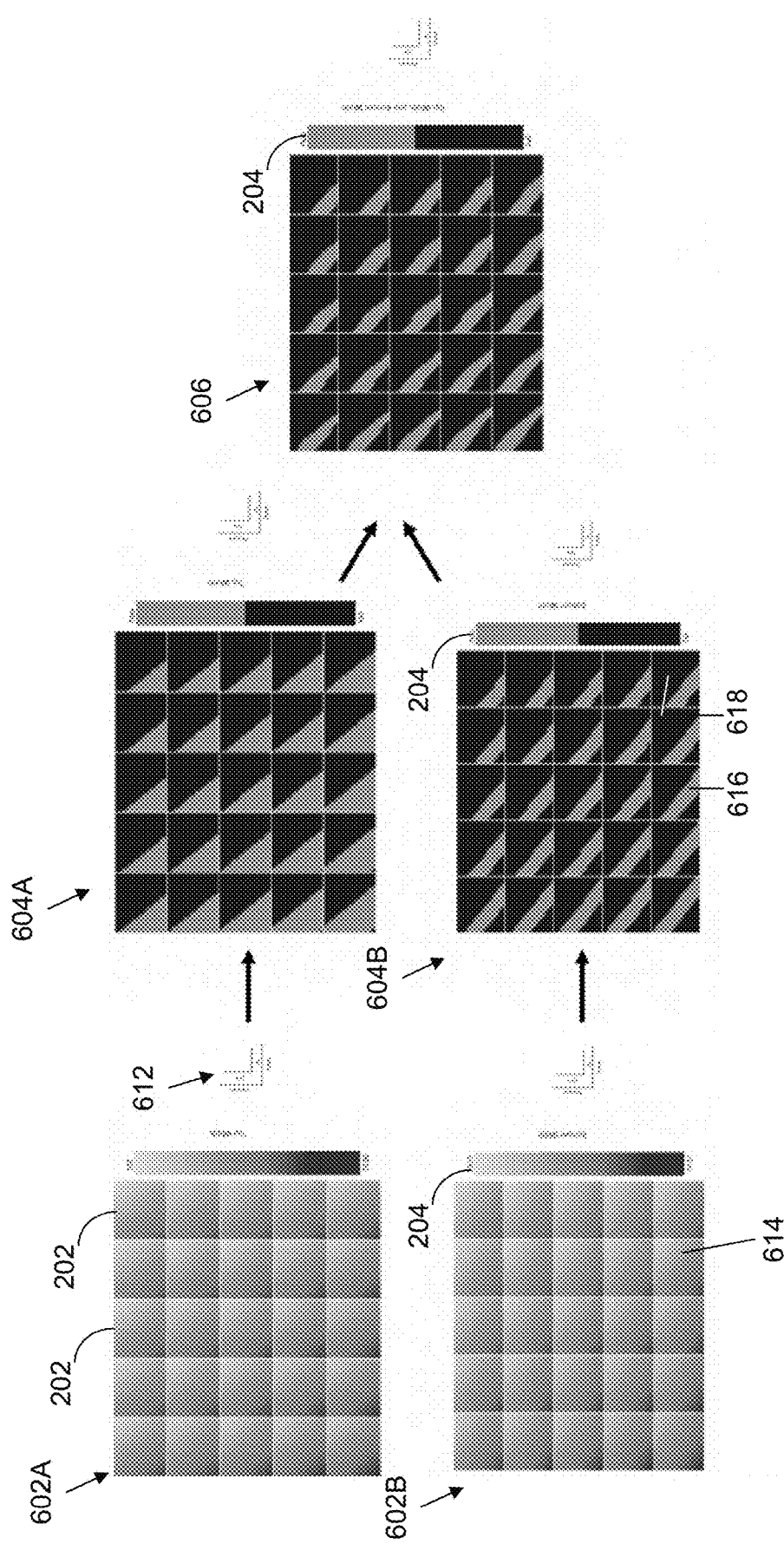
FIG. 6 is a diagram of exemplary system stage plots superposed to form superposed plot in accordance with embodiments of the disclosure.

With reference to FIG. 6, in accordance with one or more embodiments, first and second stage plots 602A, 602B are shown that were generated for respective first and second dependent variables. Each stage plot 602A, 602B includes color plots 202 in which the values for the dependent variable that was plotted are assigned a first numeric or graphical indicator 614 that is a spectral value. Filter module 122 (shown in FIG. 1) processes the spectral values of the stage plots 602A, 602B relative to a threshold value or range, assigning pass/fail values wherein a first numeric or graphical indicator 616, such as color (e.g., green), grayscale, or texture, represents pass values and a second numeric or graphical indicator 618, such as another color (e.g., blue), grayscale, or texture, represents fail values.

Filter module 122 outputs stage plot 604A having binary values converted from the spectral values of stage plot 602A. Scale guide 204 shows the colors that are used to indicate pass or fail. Filter module 122 outputs stage plot 604B having binary values converted from the spectral values of stage plot 602B. Regions in each of stage plots 604A and 604B that are indicated as pass can be considered as hotspots for that stage plot. In effect, regions of stage plots 604A, 604B that are assigned an indication to show fail values can be considered as having been eliminated.

Spatial positioning module 104 (shown in FIG. 1) superposes stage plot 604A with stage plot 604B, forming superposed plot 606. A superposed dependent variable value is assigned to each coordinate of the superposed plot 606. When assigning and displaying the superposed dependent variable value, a distinguishing characteristic can be assigned to the superposed dependent variable value for each overlapping pass region of the superposed plot 606, wherein an overlapping pass region includes registered superposed pass regions as represented in all of the stage plots included in the superposed plot (in this example 604A, 604B). Registered regions can be conceived of as regions that are stacked on top of one another for performing the superposition. If any one of the stage plots (in this example 604A, 604B) has a fail value at the registered region, the superposed dependent variable value assigned to the superposed plot is fail. In effect, regions of stage plots 604A, 604B that are assigned an indication to show fail values can be considered as having been eliminated from the superposed plot 606.

In one or more embodiments, stage plots 602A and 602B having spectral values can be superposed. The superposed dependent variable values at each region can be a function of the registered, such as statistical function (e.g., min, max, avg).

In one or more embodiments, stage plots 602A and 602B having spectral values plotted for the dependent variable value are not produced. Rather, the dependent variable value to be plotted is tested to see if it satisfies a criterion, such by comparing the dependent variable value to a threshold or threshold range before it is plotted. If the criterion is satisfied, the dependent variable value is assigned a pass value. If the criterion is not satisfied, the dependent variable value is assigned a fail value. Stage plots 604A and 604B can be plotted based on the pass and fail values assigned for the dependent variable value.

Figure 7:
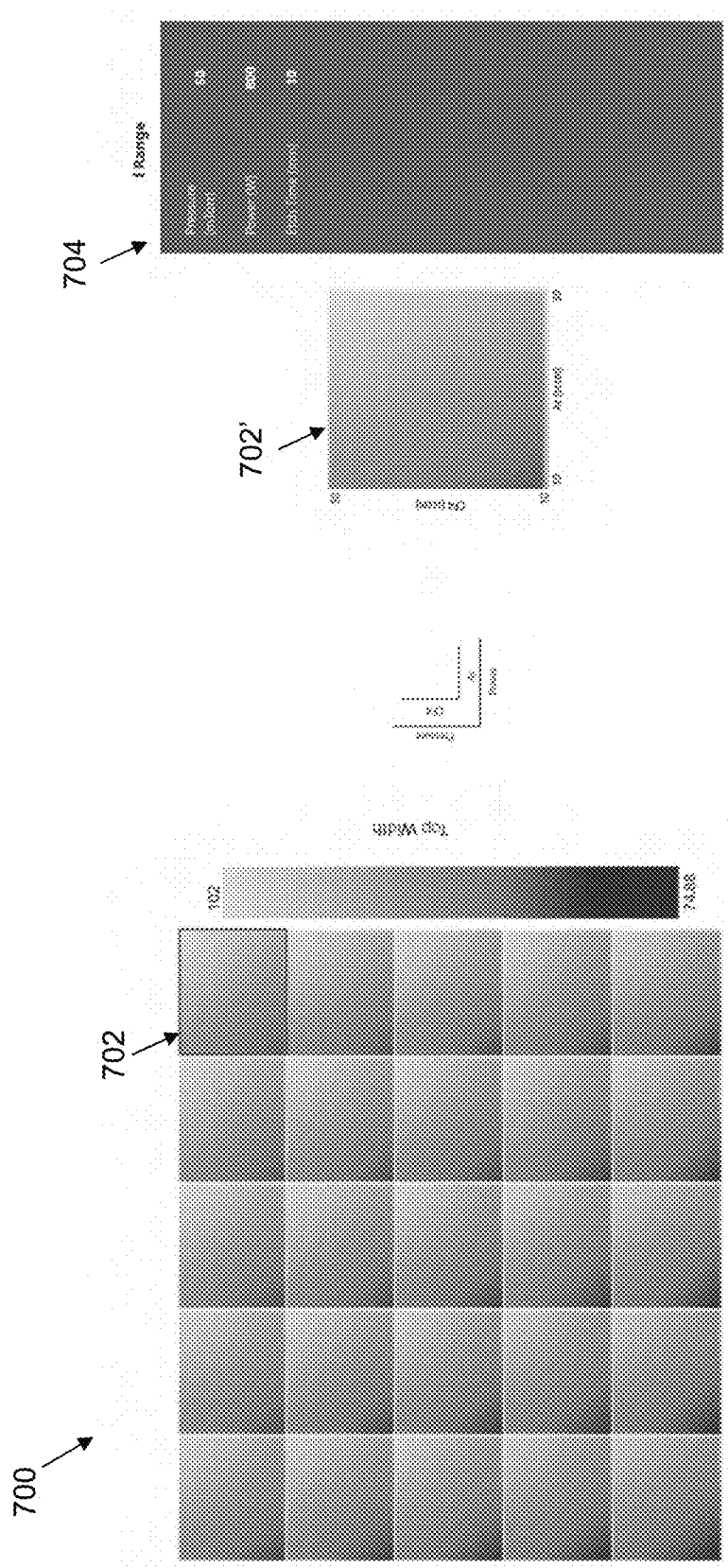
FIG. 7 is a diagram of an exemplary system stage plot as used for submitting a query and receiving a response to the query in accordance with embodiments of the disclosure.

With reference to FIG. 7, a point or area of a stage plot, or a point or area of a superplot, is shown at 700 and includes one or more color plots 702 that can be selected by a user, such as via a GUI, e.g., by right-clicking on the color plot 702 to be selected. The selection of the point or area color plot can function as submission of a query for more information. Plot 700 can be a stage plot or a superposed plot. In response, a panel 704 can display information about the selected color plot 702 in the panel and/or the selected color plot 702 can be enlarged to show more detail, as shown at 702'. Information to be displayed can include details, such as metadata, the independent variable value for the axis upon which the dependent variable is plotted, the constant value assigned to any independent variable that is not assigned to an axis, the dependent variable value for the plot, and/or the dependent variable value for any underlying stage plots. In one or more embodiments in which spectral values are displayed, information to be displayed can further include the dependent variable value at a selectable point in the color plot or statistical values for the color plot (e.g., max, min, and/or average, etc.). The user can further submit queries about any point or region of a displayed stage plot or superposed plot to learn more about one or more independent variables, dependent variables, underlying colors or stage plots, and the like. The queries can be selected by entering information and/or clicking on the display of a GUI.

Figure 8:
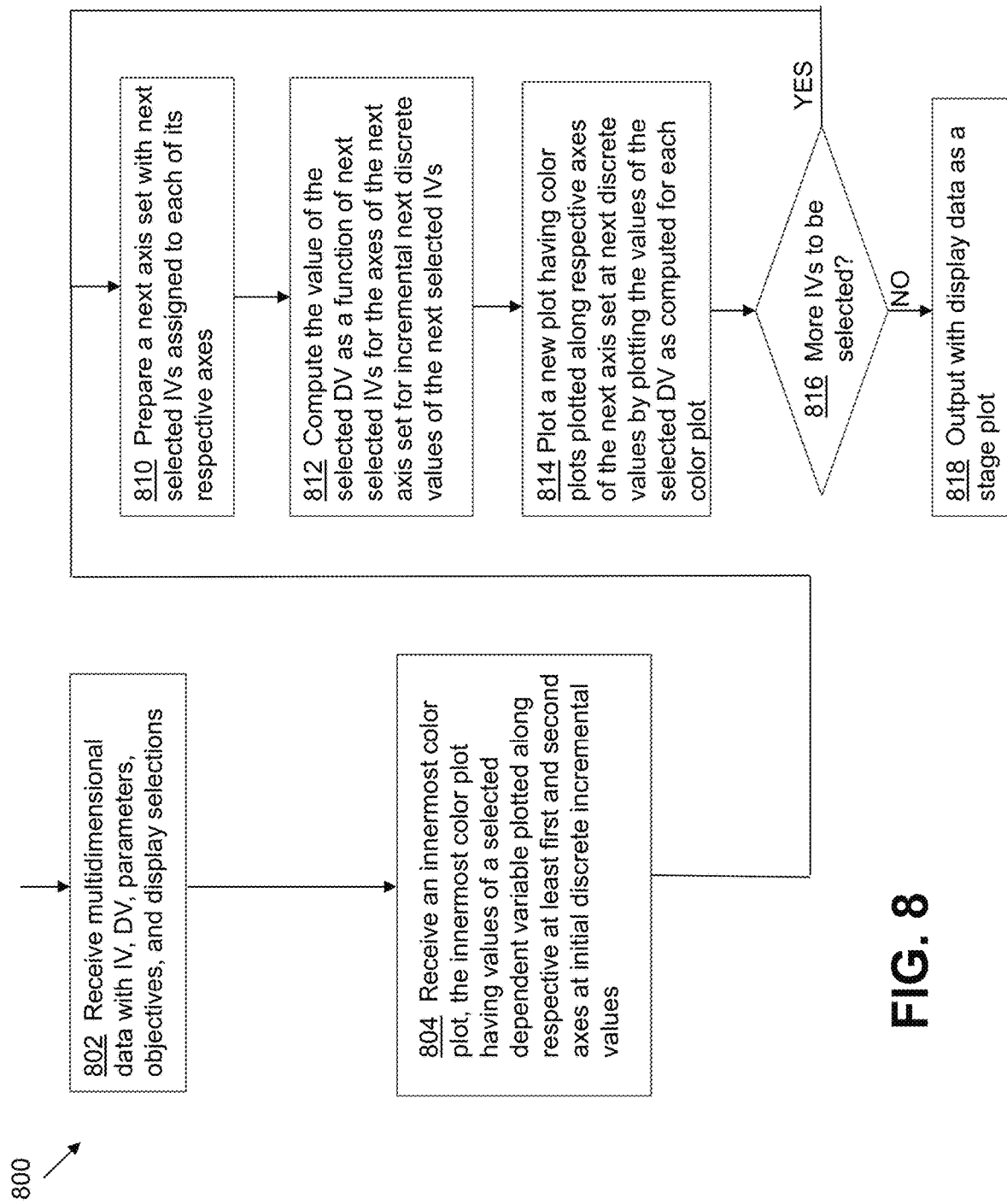
FIGS. 8-10 are flowcharts showing examples of methods performed by the optimization support engine of FIG. 1.
Figure 9:
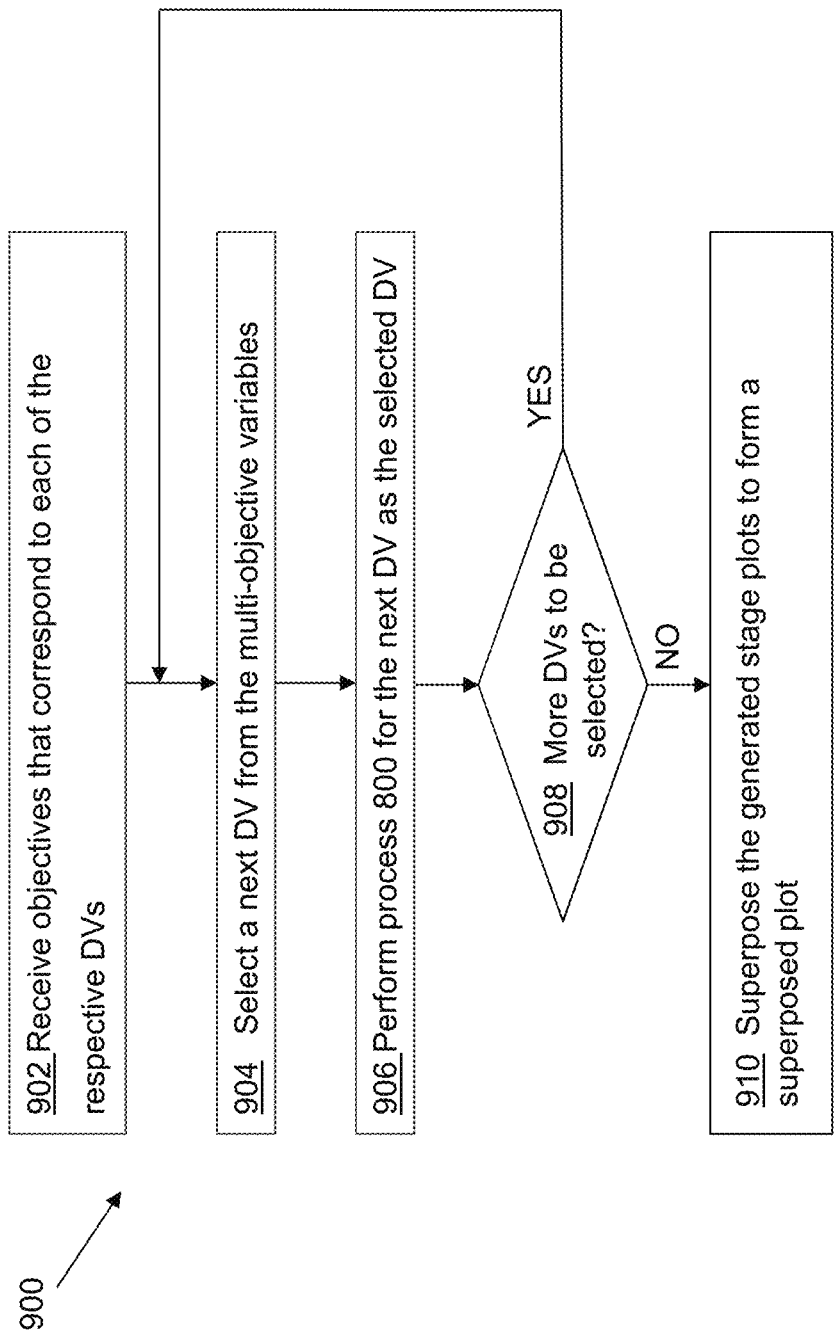
Figure 10:
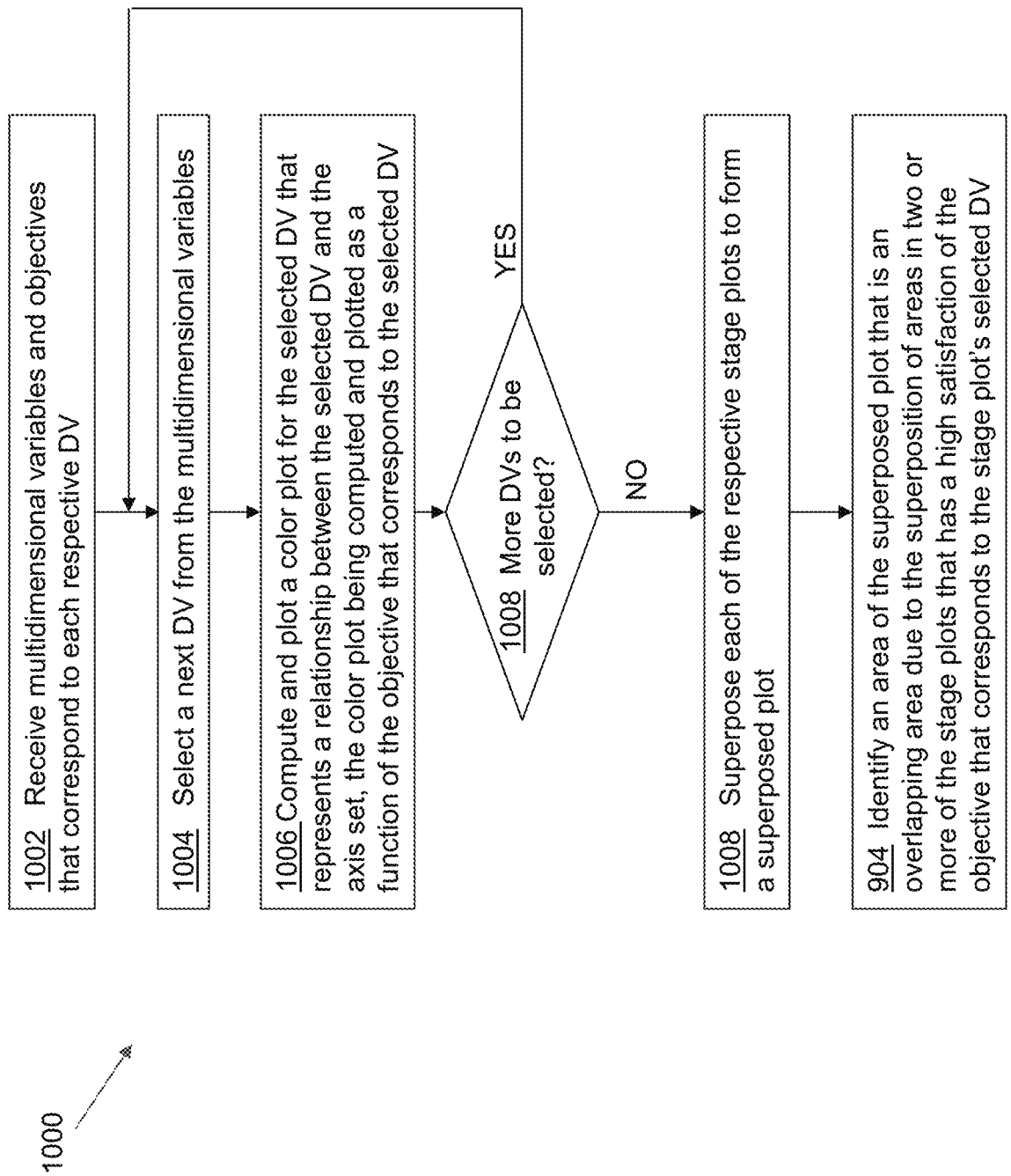

With reference now to FIGS. 8-10, flowcharts are shown demonstrating implementation of the various exemplary embodiments for providing optimization support for multi-dimensional variables. For example, the illustrated flowcharts can be used to implement the method performed by optimization support engine 102 shown in FIG. 1 in accordance with the present disclosure. It is noted that the order of operations shown in FIGS. 8-10 is not required, so in principle, one or more operations may be performed out of the illustrated sequence or in parallel with one or more other operations. Also, certain operations may be skipped, different operations may be added or substituted, or selected operations or groups of operations may be performed in a separate application following the embodiments described herein.

With reference to FIG. 8, a flowchart for a process 800 is shown. At operation 802, a multidimensional variables set is received. The multidimensional variables can include multiple independent variables (IVs), one or more dependent variables (DVs), parameters, an objective for each dependent variable, and display selections. The parameters can include, for example, a range and segmentation instructions (e.g., number of segments or segment length) for each independent variable, prioritized lists for selection of the independent and dependent variables, and mode. Mode can indicate whether filtering is applied, and if applied, whether filtering is applied before or after plotting spectral values. The display selections can include, for example, dimensionality (e.g., 2D or 3D) of the axis sets and an order in which axes of the axis sets are positioned. The information received at operation 802 can be received from one or more of process equipment, a processing device, and a user interface.

At operation 804, an innermost color plot is received. The innermost color plot has values of a selected dependent variable plotted along respective at least first and second axes at initial discrete incremental values. At operation 810, a next axis set is prepared with next selected independent variables assigned to each of its respective axes. Axes of the axis set are positioned to be parallel to corresponding axes from previously positioned axis sets. At operation 812, the value of the selected dependent variable is computed as a function of next selected independent variables for the axes of the next axis set for incremental next discrete values of the next selected independent variables. At operation 814, a plot is plotted having color plots plotted along the respective axes of the next axis set at the next discrete values by plotting the values of the selected dependent variable as computed for each color plot. At operation 816 a determination is made whether there are more independent variables available to be selected. If the determination at operation 816 is YES, meaning there are more independent variables available to be selected, the method returns to operation 810 for at least one of iteratively or concurrently repeating operations 810-816 for a next available independent variable to be selected. If the determination at operation 816 is NO, meaning there are not any more independent variables available to be selected, the method continues at operation 816. At operation 816, display data corresponding to the last iteration is output as a stage color plot.

With reference to FIG. 9, a flowchart for a process 900 is shown. At operation 902, objectives are received that correspond to each of the respective dependent variables, such as via a user interface or an external processing device. At operation 904, a next dependent variable is selected from the multidimensional variables. At operation 906, process 800 is performed for the selected dependent variable. At operation 908, a determination is made whether there are more dependent variables available to be selected. If the determination at operation is YES, meaning there are more dependent variables available to be selected, the method continues at operation 904 for selecting and processing a next dependent variable. If the determination at operation is NO, meaning there are not any more dependent variables available to be selected, the method continues at operation 910. At operation 910, the stage plots generated are superposed to form a superposed plot.

With reference to FIG. 10, a flowchart for a process 1000 is shown. At operation 1002, multidimensional variables and objectives that correspond to each respective dependent variable are received, similar to operation 802 of FIG. 8. At operation 1004, a next dependent variable is selected from the multidimensional variables. At operation 1006, a color plot is computed for the selected dependent variable using an axis set. The color plot represents a relationship between the selected dependent variable and the axis set, wherein the color plot is computed as a function of the objective that corresponds to the selected dependent variable. At operation 1008, a determination is made whether there are more dependent variables available to be selected. If the determination at operation is YES, meaning there are more dependent variables available to be selected, the method continues at operation 1004 for iteratively selecting and processing a next dependent variable. If the determination at operation is NO, meaning there are not any more dependent variables available to be selected, the method continues at operation 1010.

At operation 1010, each of the respective stage plots is superposed to form a superposed plot. At operation 1012, an area of the superposed plot is identified that is an overlapping area due to the superposition of areas in two or more of the stage plots that has a high satisfaction of the objective that corresponds to the stage plot's selected dependent variable.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of the disclosure include software algorithms, programs, or code that can reside on a computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the logic, equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Embodiments of the optimization support engine 102 may be implemented or executed by one or more computer systems. For example, optimization support engine 102 can be implemented using a computer system such as example computer system 1100 illustrated in FIG. 11. In various embodiments, computer system 1100 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 1100 is only one example of a suitable system and is not intended to suggest any limitation as to the scope of use or functionality of embodiments of the disclosure described herein. Regardless, computer system 1100 is capable of being implemented and/or performing any of the functionality set forth hereinabove.

Computer system 1100 may be described in the general context of computer system-executable instructions, such as program modules, being executed by a computer system. Generally, program modules may include routines, programs, objects, components, logic, data structures, and so on that perform particular tasks or implement particular abstract data types. Computer system 1100 may be practiced in distributed data processing environments where tasks are performed by remote processing devices that are linked through a communications network. In a distributed data processing environment, program modules may be located in both local and remote computer system storage media including memory storage devices.

Figure 11:
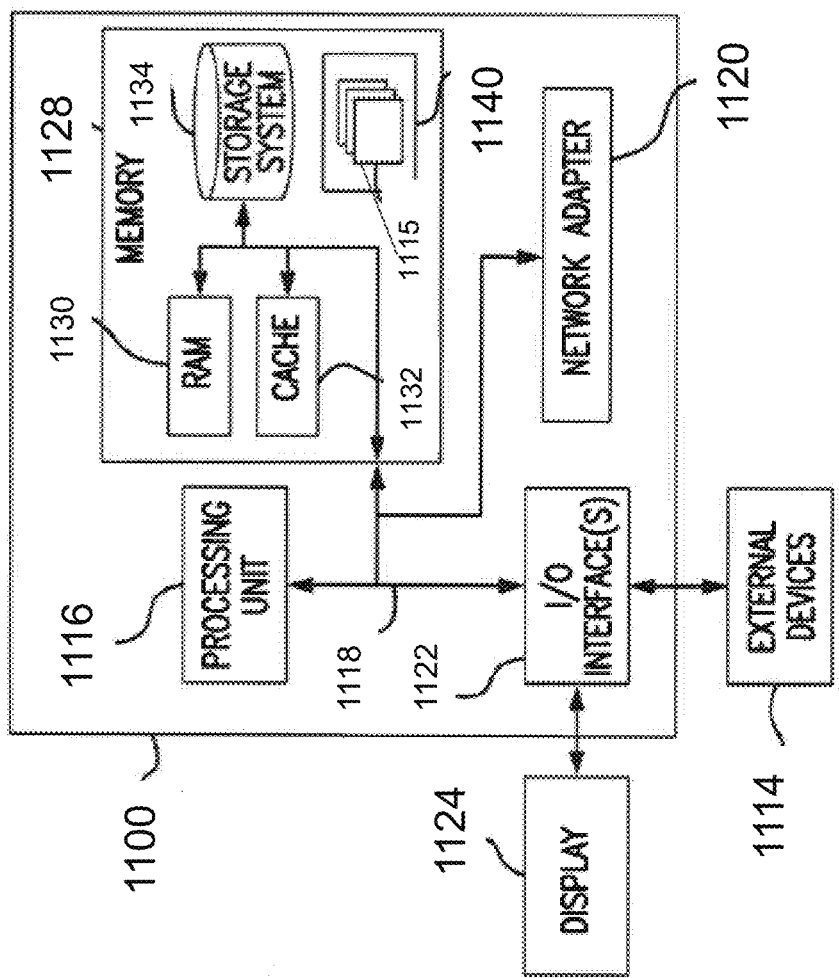
FIG. 11 is an example computer system configured to implement the optimization support engine in accordance with embodiments of the disclosure.

Computer system 1100 is shown in FIG. 11 in the form of a general-purpose computing device. The components of computer system 1100 may include, but are not limited to, one or more processors or processing units 1116, a system memory 1128, and a bus 1118 that couples various system components including system memory 1128 to processor 1116.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 1100 typically includes a variety of computer system readable media. Such media may be any available media that is accessible by computer system 1100, and it includes both volatile and non-volatile media, removable and non-removable media.

System memory 1128 can include computer system readable media in the form of volatile memory, such as random-access memory (RAM) 1130 and/or cache memory 1132. Computer system 1100 may further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1118 by one or more data media interfaces. As will be further depicted and described below, memory 1128 may include at least one program product having a set (e.g., at least one) of program modules that are configured to carry out the functions of embodiments of the disclosure.

Program/utility 1140, having a set (at least one) of program modules 1115, such as computer system model 120, filter 122, spatial positioning module 124, analysis module 126, and user interface 128 may be stored in memory 1128 by way of example, and not limitation, as well as an operating system, one or more application programs, other program modules, and program data. Each of the operating system, one or more application programs, other program modules, and program data or some combination thereof, may include an implementation of a networking environment. Program modules 1115 generally carry out the functions and/or methodologies of embodiments of the disclosure as described herein.

Computer system 1100 may also communicate with one or more external devices 1114 such as process equipment 104, a keyboard, a pointing device, a display 1124, etc.; one or more devices that enable a user to interact with computer system 1100; and/or any devices (e.g., network card, modem, etc.) that enable optimization support engine 102 to communicate with one or more other computing devices. Such communication can occur via Input/Output (I/O) interfaces 1122. Still yet, computer system 1100 can communicate with one or more networks such as a local area network (LAN), a general wide area network (WAN), and/or a public network (e.g., the Internet) via network adapter 1120. As depicted, network adapter 1120 communicates with the other components of a network (not shown) via bus 1118. It should be understood that although not shown, other hardware and/or software components could be used in conjunction with computer system 1100. Examples, include, but are not limited to: microcode, device drivers, redundant processing units, external disk drive arrays, RAID systems, tape drives, and data archival storage systems, and so on.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A potential advantage of the various embodiments of the optimization support engine disclosed is provision of a new way for presenting and organizing data so that it is analytically or visually organized to show hotspots that correlate to multidimensional variables, including for a very large number of such variables. A system analyzing and/or displaying the data as organized can respond to a user query for values of multiple independent variables that are optimized for one or more selected objectives, wherein the number of multiple objectives is theoretically unlimited.

Applications of the optimization support engine can include any application in which multidimensional variables are used, such as semiconductor design and production, including plasma etching and/or deposition, any industrial process, and simulated or measured natural processes.

While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A method for providing optimization support for multidimensional variables, the method comprising:
receiving multidimensional variables including at least four independent variables and at least one dependent variable;
receiving a color plot having values of a selected dependent variable of the at least one dependent variable plotted along respective at least first and second axes, at least first and second independent variables of the at least four independent variables being assigned to the respective at least first and second axes, wherein the dependent variable is plotted at a position in the color plot that shows a spatial relationship to values of the respective at least first and second independent variables;
preparing a second axis set of a plurality of axis sets, the second axis set having at least two axes;
assigning at least third and fourth independent variables of the at least four independent variables to the respective at least two axes of the second axis set, each of the at least two axes of the second axis set varying over respective ranges of the at least third and fourth independent variables and divided into respective segments of equal length, wherein a discrete incremental value is assigned to each of the segments based on values of the corresponding independent variable of the at least third and fourth independent variables within the segment;
recomputing the color plot using a combination of discrete incremental values that correspond to the segments along each of the at least two axes of the second axis set, including computing the value of the selected dependent variable as a function of the combination of discrete incremental values; and
plotting each recomputed color plot along the at least two axes of the second axis set at a position that corresponds to the segments to which corresponds the combination of discrete incremental values used to recompute the color plot, wherein each position of the dependent variable in the plotted recomputed color plots shows a spatial relationship to values of the respective at least first and second independent variables and the at least third and fourth independent variables and a representation of the value of the dependent variable is provided at the position, wherein a stage plot includes the plotted recomputed color plots.

2. The method of claim 1, wherein independent variables assigned to axes for which selected dependent variable values were already plotted are held constant.

3. The method of claim 1, wherein the at least four independent variables include more than four independent variables, the method further comprising:
repeating iteratively the following until there are no more remaining independent variables of the at least four independent variables:
preparing a next axis set of the plurality of axis sets, the next axis set having at least one next axis;
assigning a next independent variable from remaining independent variables of the at least four independent variables to the respective at least one next axis, each of the at least one next axis of the next axis set varying over respective ranges of the corresponding next independent variable and divided into respective next segments of equal length, wherein a next discrete incremental value is assigned to each of the next segments based on values of the corresponding next independent variable within the next segment;
recomputing each color plot using a next combination of next discrete incremental values that correspond to the next segments along each of the at least one next axis of the next axis set, including computing the value of the selected dependent variable as a function of the next combination of next discrete incremental values; and
plotting each recomputed color plot along the respective at least one next axis at a position that corresponds to the next segments to which corresponds the next combination of next discrete incremental values used to recompute the color plot, wherein each position of the dependent variable in the plotted recomputed color plots shows a spatial relationship to values of the respective at least first and second independent variables, the at least third and fourth variables, and the at least one next independent variables, wherein the stage plot includes the recomputed color plots.

4. The method of claim 3, further comprising outputting the stage plot for display.

5. The method of claim 4, wherein the values of the selected dependent variable are represented using a spectrum of two or more colors.

6. The method of claim 3, wherein the selected dependent variable is a first selected dependent variable and the multidimensional variables include at least two dependent variables including the first selected dependent variable, the method further comprising:

receiving a plurality of objectives, including a first objective associated with the first selected dependent variable and respective objectives associated with each of the remaining dependent variables of the at least two dependent variables, wherein the already plotted dependent variables are determined as a function of the first objective;

repeating the following until there are no more remaining dependent variables of the at least two dependent variables for generating a next stage plot:

selecting a next dependent variable of the at least two dependent variables;

receiving a second color plot having values of the selected dependent variable plotted along the respective at least first and second axes at initial discrete incremental values; and repeating the following until there are no more remaining independent variables of the at least four independent variables:

preparing the next axis set of the plurality of axis sets for the next stage plot;

assigning the at least one next independent variable of the remaining independent variables of the at least four independent variables to the respective at least one next axis;

recomputing each second color plot using the next combination of next discrete incremental values that correspond to the next segments along each axis of the next axis set, including, computing the value of the next selected dependent variable as a function of the next combination of next discrete incremental values; and plotting each recomputed second color plot along the respective at least one next axis prepared for the next stage plot at a position that corresponds to the segments to which correspond the next combination of next discrete incremental values used to recompute the second color plot, wherein the next stage plot includes the plotted recomputed second color plots; and superposing each next stage plot on the stage plot to form a superposed plot.

7. The method of claim 6, wherein the values of the selected dependent variable and the next selected dependent variables are represented as pass or fail based on whether the objective corresponding to the first or next dependent variable is satisfied.

8. The method of claim 7, wherein a determination whether to represent the values of the selected dependent variable and the next selected dependent variables as pass or fail is based on the values for the selected dependent variable and the next selected dependent variable as computed and before being plotted.

9. The method of claim 6, wherein a determination whether to represent the values of the selected dependent variable and the next selected dependent variables as pass or fail is based on plotted values represented as a spectral value based on a result of computation of the values of the selected dependent variable and the next selected dependent variables.

10. The method of claim 7, further comprising in the superposed plot, assigning a distinguishing characteristic to each overlapping region of the superposed plot, wherein an overlapping region that includes registered superposed pass representations in each of the first stage and next stage plots included in the superposed plot.

11. The method of claim 8, further comprising identifying the independent variables that correspond to the overlapping region.

12. The method of claim 8, wherein the superposed plot includes superposed stage plots, each superposed stage plots having underlying color plots that include initial color plots and color plots from respective repetitions until there were no remaining independent variables, the method further comprising:

outputting the superposed plot for display;

receiving user input selection of an area or point of the superposed plot;

identifying one or more superposed stage plots superposed at the selected area or point;

identifying one or more of the underlying color plots; and outputting for display details about one or more of the underlying color stage plots or the one or more underlying color plots at the input selection.

13. The method of claim 12, wherein the details include at least one of values or value ranges of independent or dependent variables and/or an enlargement of the underlying color stage plots or the one or more underlying color plots at the input selection.

14. The method of claim 12, wherein the user input selection further includes selection of one or more underlying color plots, and the display details are output for the selected one or more underlying color plots.

15. The method of claim 3, the method further comprising:

outputting the stage plot for display;

receiving user input selection of an area or point of the stage plot;

identifying one or more color plots included in the selected area or point;

outputting for display details about one or more of the color plots included in the input selection.

16. The method of claim 1, wherein independent variables that are not yet assigned to an axis are held constant.

17. The method of claim 1, wherein computing the value of the selected dependent variable as a function of the discrete incremental values assigned to the respective segments that correspond to the third independent variable and plotting the color plots along the third axis is performed at least one of iteratively and concurrently with computing the value of the selected dependent variable as a function of the discrete incremental values assigned to the respective segments that correspond to the fourth independent variable and plotting the color plots along the fourth axis.

18. A method for providing optimization support for multidimensional variables, the method comprising:

receiving multidimensional variables including at least two independent variables and at least two dependent variables;

receiving a plurality of objectives, including a first and second objective associated with respective first and second dependent variables of the at least two dependent variables;

computing a first color plot that represents a relationship between the first dependent variable and an axis set of at least two axes that correspond respectively to at least first and second independent variables of the at least two independent variables, wherein a first color of the first color plot is determined as a function of the first objective;

computing a second color plot that represents a relationship between the second dependent variable and the axis set, wherein the at least two axes correspond respectively to the at least first and second independent variables of the at least two independent variables, wherein a second color of the second color plot is determined as a function of the second objective; and superposing the first and second color plots to form a superposed plot.

19. The method of claim 18, wherein the first color potentially includes a first area that has a high satisfaction of the first objective, and the second color plot potentially includes a second area that has a high satisfaction of the second objective, and the method further comprises identifying an area of the superposed plot in which the first area and the second area overlap via the superposition.

20. The method of claim 18, wherein receiving the plurality of objectives includes receiving an objective corresponding to each of the respective dependent variables, the method further comprising:

performing the following for each of the dependent variables until there are no remaining dependent variables:
selecting a next dependent variable of the remaining dependent variables; and
computing a color plot for the selected dependent variable that represents a relationship between the selected dependent variable and the axis set, wherein the color of each of the color plots is plotted as a function of the objective that corresponds to the selected dependent variable, wherein the color potentially includes an area that has a high satisfaction of the objective that corresponds to the dependent variable selected for that color plot;
superposing each of the respective color plots with the first and second color plots to form a superposed plot; and
identifying an area of the superposed plot in which areas of the respective color plots overlap via the superposition.

21. A process optimization support system, the system comprising:
a memory configured to store program instructions;
a processor disposed in communication with said memory, wherein the processor upon execution of the program instructions is configured to:
receive multidimensional variables including at least four independent variables and at least one dependent variable;
receive a color plot having values of a selected dependent variable of the at least one dependent variable plotted along respective at least first and second axes, at least first and second independent variables of the at least four independent variables being assigned to the respective at least first and second axes, wherein the dependent variable is plotted at a position in the color plot that shows a spatial relationship to values of the respective at least first and second independent variables;

repeat the following at least one of iteratively and concurrently until there are no more remaining independent variables of the at least four independent variables;
prepare a next axis set of a plurality of axis sets, the next axis set having at least one next axis;
assign at least one next independent variable of remaining independent variables of the at least four independent variables to the respective at least one next axis, each of the at least one next axis of the next axis set varying over respective ranges of the corresponding next independent variable and divided into respective next segments of equal length, wherein a next discrete incremental value is assigned to each of the next segments based on values of the corresponding next independent variable within the next segment; and
recompute each color plot using a next combination of next discrete incremental values that correspond to the next segments along each of the at least one next axis of the next axis set, including compute the value of the selected dependent variable as a function of the next combination of next discrete incremental values; and
plot each recomputed color plot along the at least one next axis of the next axis set at a position that corresponds to the segments to which corresponds the combination of discrete incremental values used to recompute the color plot, wherein a stage plot includes the plotted recomputed color plots.

22. The process optimization support system of claim 21, wherein the selected dependent variable is a first selected dependent variable and the multidimensional variables includes at least two dependent variables including the first selected dependent variable, wherein the processor upon execution of the program instructions is further configured to:

receive a plurality of objectives, including a first objective associated with the first selected dependent variable and respective objectives associated with each of the remaining dependent variables of the at least two dependent variables, wherein the already plotted dependent variables are determined as a function of the first objective;

repeat the following until there are no more remaining dependent variables of the at least two dependent variables for generating a next stage plot:
select a next dependent variable of the at least two dependent variables;
plot for the next selected dependent variable of remaining dependent variables of the at least two dependent variables a second initial color plot for the first axis set; and
repeat the following until there are no more remaining independent variables of the at least four independent variables;
prepare the next axis set of the plurality of axis sets for the next stage plot;
assign the at least one next independent variable of the remaining independent variables of the at least four independent variables to the respective at least one next axis;
recompute each second color plot using the next combination of next discrete incremental values that correspond to the next segments along each axis of the next axis set, including compute the value of the next selected dependent variable as a function of the next combination of next discrete incremental values and as a function of all axes for which the values of the next selected dependent variable were previously plotted; and plot each recomputed second color plot along the respective at least one next axis prepared for the next stage plot at a position that corresponds to the segments to which correspond the next combination of next discrete incremental values used to recompute the second color plot, wherein the next stage plot includes the plotted recomputed second color plots; and superpose each next stage plot on the stage plot to form a superposed plot.

23. A non-transitory computer-readable storage medium and one or more computer programs embedded therein, the computer programs comprising instructions, which when executed by a computer system, cause the computer system to:

receive multidimensional variables including at least four independent variables and at least one dependent variable;

receive a color plot having values of a selected dependent variable of the at least one dependent variable plotted along respective at least first and second axes, at least first and second independent variables of the at least four independent variables being assigned to the respective at least first and second axes, wherein the dependent variable is plotted at a position in the color plot that shows a spatial relationship to values of the respective at least first and second independent variables;

repeat the following at least one of iteratively and concurrently until there are no more remaining independent variables of the at least four independent variables:

prepare a next axis set of the plurality of axis sets, the next axis set having at least one next axis;

assign at least one next independent variable of remaining independent variables of the at least four independent variables to the respective at least one next axis, each of the at least one next axis of the next axis set varying over respective ranges of the corresponding next independent variable and divided into respective next segments of equal length, wherein a next discrete incremental value is assigned to each of the next segments based on values of the corresponding next independent variable within the next segment;

recompute each color plot using a next combination of next discrete incremental values that correspond to the next segments along each of the at least one next axis of the next axis set, including compute the value of the selected dependent variable as a function of the next combination of next discrete incremental values; and plot each recomputed color plot along the at least one next axis of the next axis set at a position that corresponds to the segments to which corresponds the combination of discrete incremental values used to recompute the color plot, wherein a stage plot includes the plotted recomputed color plots.

24. The non-transitory computer readable storage medium of claim 23 and one or more computer programs embedded therein, wherein the selected dependent variable is a first selected dependent variable and the multidimensional variables includes at least two dependent variables including the first selected dependent variable, wherein the computer system upon execution of the instructions is further configured to:

receive a plurality of objectives, including a first objective associated with the first selected dependent variable and respective objectives associated with each of the remaining dependent variables of the at least two dependent variables, wherein the already plotted dependent variables are determined as a function of the first objective;

repeat the following until there are no more remaining dependent variables of the at least two dependent variables for generating a next stage plot:

select a next dependent variable of the at least two dependent variables;

plot for the next selected dependent variable of remaining dependent variables of the at least two dependent variables a second initial color plot for the first axis set; and repeat the following until there are no more remaining independent variables of the at least four independent variables:

prepare the next axis set of the plurality of axis sets for the next stage plot;

assign the at least one next independent variable of the remaining independent variables of the at least four independent variables to the respective at least one next axis;

recompute each second color plot using the next combination of next discrete incremental values that correspond to the next segments along each axis of the next axis set, including compute the value of the next selected dependent variable as a function of the next combination of for next discrete incremental values and as a function of all axes for which the values of the next selected dependent variable were previously plotted; and plot each recomputed second color plot along the respective at least one next axis prepared for the next stage plot at a position that corresponds to the segments to which correspond the next combination of next discrete incremental values used to recompute the second at color plot, wherein the next stage plot includes the plotted recomputed second color plots; and superpose each next stage plot on the stage plot to form a superposed plot.

* * * * *